United States Patent [19]

Kusilek

[11] 4,351,683

[45] Sep. 28, 1982

[54] METHOD OF FORMING WEB MATERIAL

[75] Inventor: LeRoy I. Kusilek, River Falls, Wis.

[73] Assignee: Minnesota Mining and Manufacturing Company, Saint Paul, Minn.

[21] Appl. No.: 83,450

[22] Filed: Oct. 23, 1970

Related U.S. Application Data

[63] Continuation-in-part of Ser. No. 676,497, Oct. 19, 1967, abandoned.

[51] Int. Cl.$^3$ ............................................. D04B 3/16
[52] U.S. Cl. .................................. 156/167; 156/181; 264/178 F; 428/198; 428/371
[58] Field of Search ............... 156/167, 181; 264/168, 264/171, 178; 161/169, 150, 166

[56] References Cited

U.S. PATENT DOCUMENTS

| | | | |
|---|---|---|---|
| 1,672,943 | 6/1928 | Jackson | 264/176 F |
| 1,685,640 | 9/1928 | Leaver | 264/176 F |
| 2,366,278 | 1/1945 | Mehler, Jr. | 264/176 F |
| 2,395,371 | 2/1946 | Dockerty | 428/369 |
| 2,439,034 | 4/1948 | Battista | 264/176 F |
| 2,455,174 | 11/1948 | Hitt | 264/176 F |
| 2,473,528 | 6/1949 | Hoover | 264/176 F |
| 2,577,214 | 12/1951 | Slayter | 156/181 |
| 2,696,639 | 12/1954 | Meyer et al. | 264/176 F |
| 2,736,676 | 2/1956 | Frickert, Jr. | 156/181 |
| 2,746,086 | 5/1956 | Vickers | 264/176 F |
| 2,780,909 | 2/1957 | Biefield et al. | 264/176 F |
| 2,939,177 | 6/1960 | Guentert et al. | 264/109 |
| 2,940,886 | 6/1960 | Nachtman | 156/167 |
| 3,026,272 | 3/1962 | Rubens et al. | 264/176 F |
| 3,029,124 | 4/1962 | Farrow | 264/176 F |
| 3,060,501 | 10/1962 | Beal | 264/176 F |
| 3,080,611 | 3/1963 | Jarrett et al. | 264/176 F |
| 3,148,101 | 9/1964 | Allman, Jr. et al. | 156/167 |
| 3,236,616 | 2/1966 | Stalego et al. | 65/5 |
| 3,288,582 | 11/1966 | Wong et al. | 65/3 |
| 3,295,942 | 1/1967 | Smock et al. | 156/167 |
| 3,304,220 | 2/1967 | McIntyre | 156/181 |
| 3,314,840 | 4/1967 | Lloyd et al. | 156/181 |
| 3,333,040 | 7/1967 | Nakahara | 264/164 |
| 3,341,394 | 9/1967 | Kinney | 156/167 |
| 3,368,934 | 2/1968 | Vosburgh | 156/181 |
| 3,423,266 | 1/1969 | Davies et al. | 156/167 |
| 3,439,085 | 4/1969 | Hartmann | 264/210 |
| 3,512,230 | 5/1970 | Luzzatto | 156/181 |
| 3,522,025 | 7/1970 | Smith | 65/12 |
| 3,539,676 | 11/1970 | Polestak | 264/176 |
| 3,542,615 | 11/1970 | Dobo et al. | 156/181 |
| 3,691,004 | 9/1972 | Werner et al. | 156/167 |

FOREIGN PATENT DOCUMENTS

| | | | |
|---|---|---|---|
| 1077225 | 4/1954 | France | |
| 1347178 | 11/1963 | France | |
| 1459929 | 10/1966 | France | |
| 1459929 | 11/1966 | France | 264/171 |
| 200324 | 10/1938 | Switzerland | 156/167 |
| 17549 | of 1899 | United Kingdom | |
| 795444 | 5/1958 | United Kingdom | |

OTHER PUBLICATIONS

Japan–Publication 4993, 1962, Application No. 48661/60 Kainy.

*Primary Examiner*—Michael W. Ball
*Attorney, Agent, or Firm*—Cruzan Alexander; Donald M. Sell; Richard Francis

[57] ABSTRACT

A method of forming a resilient open fibrous web of inter-engaged coarse continuous kinky filaments, with one major surface of the web being flattened. The method involves extruding a bundle of filaments of a thermoplastic material, aligning the bundle so the filaments fall into a quench bath and upon a contact surface so as to provide differential quenching, and advancing the resulting web at a slower rate than the rate of extrusion.

4 Claims, 4 Drawing Figures

METHOD OF FORMING WEB MATERIAL

BACKGROUND OF THE INVENTION

This application is a continuation-in-part of copending application Ser. No. 676,497 filed Oct. 19, 1967, now abandoned.

This invention relates to a method of making filamentous web materials. More particularly, the invention relates to a method, utilizing differential quenching, of preparing springy or resilient, crush resistant, open mats of inter-engaged, irregularly coiled or crinkled, high denier continuous monofilaments. At least one major surface is flattened and of greater density than the interior of the mat, thereby improving the initial integrity of the product and making possible an otherwise unobtainable uniformity in thickness and in surface smoothness.

An important field of utility for the products of the invention is in weather-resistant outdoor mats or carpeting. The smooth face of the web permits improved contact with the supporting surface and is particularly helpful in assuring good bonding with mastic or adhesive compositions applied thereto. The crush-resistant large-diameter crinkled filaments provide a safe, pleasant and wear-resistant walking surface. The extremely open nature of the web and the smooth surface of the filaments permits easy cleaning and washing as well as rapid drying. If desired, the mat may be further reinforced and strengthened by treatment with various resins or polymers applied from solution or suspension or in other ways; but the mat as is first formed has a surprisingly high degree of integrity permitting winding into rolls for storage, unwinding and handling for application, and subsequent treatment in use without disintegration.

The mat has also been found useful in the preparation of flexible molds for electrical cable splice areas and the like. A section of the mat is placed against an adhesive-coated non-porous flexible film, and the combination then folded about the splice area and sealed at the sides, in effect forming an open-top pouch which is then filled with suitable potting compound. The crush-resistant open mat holds the film at the desired distance from the cable while permitting the liquid compound to penetrate and fill the entire pouch and, after hardening, to encapsulate and insulate the splice area.

DESCRIPTION OF THE PRIOR ART

Ribbon-like mats have been prepared by extruding polymeric material into filaments onto a surface, flattening the extrusions together with a roller, and then quenching the resulting ribbon-like structure, e.g., as shown in French Pat. No. 1,459,929. This ribbon-like product is flat, and it lacks the highly expanded lofty open structure of the web of the present invention.

Other web products have been prepared by extruding polymeric materials into filaments and allowing the filaments to fall upon a collecting surface to be cooled thereon without the benefit of a quench bath. Such products will not have a lofty open structure, but they will be flattened or compacted on the collecting surface unless permitted to pre-cool and rigidify in the air. If the filaments cool in air, however, they will not have the crinkling or inter-engagement of the filaments such as obtained in the present invention.

SUMMARY OF THE INVENTION

The mat is prepared by extruding or melt-spinning a molten polymer in the form of a bundle of free-flowing thick filaments which progresses vertically downwardly into glancing contact with a contact surface of a smooth plate or roll and into a quench bath. The contact surface is maintained just above the surface of the quench bath so that filaments making glancing contact with it will thereafter fall into the quench bath. The filament bundle is aligned to permit some of the outer filaments to make such contact with the contacting surface and the remaining filaments in the bundle to fall directly into the quench bath, thereby providing differential quenching which imparts unique structural properties to the web of the invention. The filaments are continuously withdrawn through the liquid cooling medium of the quench bath in a path which diverges from the vertical direction of melt-spinning. The point at which the direction of withdrawal of filaments diverges from the vertical direction is located in a zone extending from about the surface of the bath to a distance below the surface. The web is advanced at a slower rate of speed than the extrusion rate causing the quenched portion of the bundle to continuously support the incoming portion. As a result there is produced a novel filamentous web having a flattened surface and a highly expanded lofty open structure.

The many advantages and features of the present invention can best be understood and appreciated by reference to the accompanying drawing and wherein.

Figure 1:
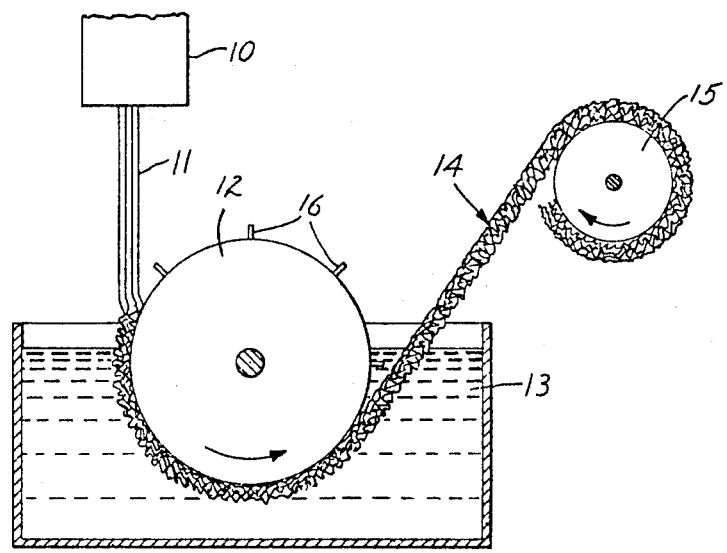
FIG. 1 is a schematic illustration in elevation showing the process and apparatus used in making the mat.
Figure 2:
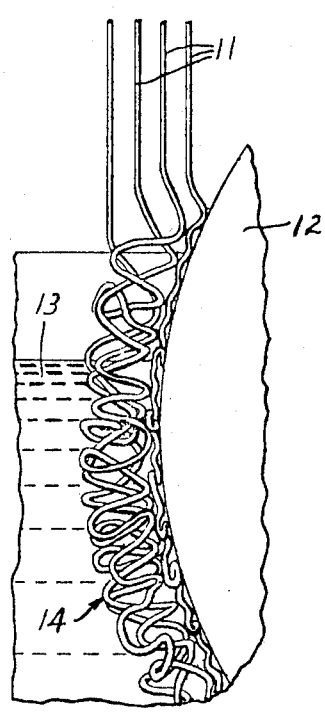
FIG. 2 is an enlarged detail view of a portion of FIG. 1 illustrating an integral aspect of the method of the invention.

In FIG. 1 the liquid fused polymer is extruded from a perforated nozzle or spinnerette head 10 as individual streams or filaments 11 which fall freely for a short distance before advancing into the quench bath 13. As filaments enter the quench bath they cool and rigidify, thereby setting up a degree of resistance to the flow of the molten streams which as a consequence are caused to oscillate as illustrated in detail in FIG. 2, just above the bath surface. The resulting wavy motion causes the filaments to spread laterally in the quench bath and establishes irregular periodic point contact between the still hot and coherent streams, causing spot welding of the filaments at those points. Coils or loops of outer filaments also come into contact with the smooth surface of the drum 12 and are thereby prevented from oscillation thus flattening the loops in that direction. The drum 12 rotates at a predetermined surface speed which is substantially lower than the rate of lineal movement of the filaments. A preferred ratio of drum speed to filament speed, as measured by the ratio of mat length to lengths of individual filaments contained therein, is between about ½ and about 1/7. The bundle of filaments is rapidly cooled and rigidified in the quench bath to form the integrated mat 14, which is then withdrawn from the bath and wound up on storage roll 15. The surface of the drum may be provided with spaced pins or pegs 16 or may be otherwise modified to assist in controlling the advance or modifying the structure of the mat 14 but is preferably generally smooth.

It will be seen that the surface of the drum 12 is wetted by immersion in the quench bath; but this is not essential, since stationary dry polished metal or other plates or the like have also been found to provide effective contact surfaces. Where danger of adhesion or otherwise induced sticking at the surface may be present, low-adhesion smooth coatings or films may be applied to the contact surface.

The amount of bonding or spot welding occurring during the process just described may be adjusted by changes in the particular polymer employed, the temperature of the filament at point of contact, the diameter of the filament, the rate of withdrawal of the mat, and in other ways. The additional number of contacts between filaments occasioned by contact with the smoothing plate or roll adds sufficient bonding to maintain adequate integrity and good handling characteristics in the mat while still permitting the removal of individual filaments in substantially continuous lengths without breakage.

Figure 3:
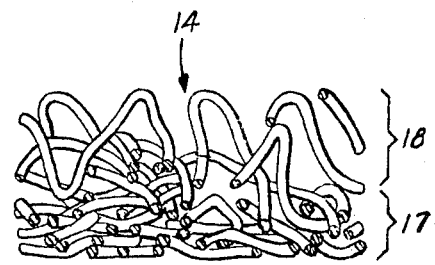
FIG. 3 is an enlarged detail view illustrating the three dimensional arrangement of filaments in a narrow segment of a typical mat as made on the apparatus and by the method of FIG. 1.

FIG. 3 shows a thin section taken from a typical mat 14. It will be noted that the density of filaments in the lower portion or bottom side 17 of the section as shown is considerably greater than that in the upper portion or top side 18. The filaments are crinkled and interengaged to provide a crush resistant resilient mat having substantial integrity. Adjacent surfaces of the interengaged filaments are effectively bonded during the process to produce a mat structure of surprising integrity.

The width and thickness of mat which may be produced by the technique just described is limited, e.g., by the size of extruder and number of orifices. As an example, a typical mat may contain a total of 260 filaments and have a width of eight inches and a thickness of ¾ inch. Fortunately it is found that the edges or faces of such webs may be joined together in a fully effective manner to produce webs of any desired width. The laterally extending coils and loops of the filaments along the adjacent surfaces intermesh sufficiently to produce a surprisingly effective bond when further treated with minimal quantities of hardenable liquid adhesive.

Figure 4:
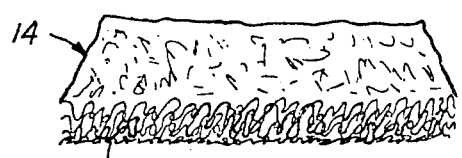
FIG. 4 is a representation in perspective of a segment of a mat having one flattened surface as prepared on the apparatus of FIG. 1.

As further illustrated by FIG. 4 the flattened surface portion 30 of mat 14 contains a higher concentration or density of filament than does the remainder of the structure, and presents a greater contact area than does the opposite unflattened surface. As a result, adhesives are enabled to form a strong bond with the flattened surface. It is possible to flatten both surfaces, simply by including a second smooth-surfaced plate or drum in position for glancing contact with the outer surface of the web or extruded soft filaments, where such modification is desired, while still retaining the open low density structure throughout the center of the web. In another modification the filaments are extruded in a bundle having a generally circular or oval or other blocky cross-section which is completely encircled by an annular contact plate to form a continuous high-density smooth surface and a low-density interior.

The difference in surface density obtained between mat surfaces formed under free fall conditions and against a contact surface respectively can be graphically represented by contact prints prepared by lightly touching the surface of the mat to a smoothly inked plate or roll and then lightly pressing the inked surface against a smooth white paper. Black lines thereby created represent the inked surfaces of the filaments at the paper-contacting surface. Another method of measuring these surface differences involves a measurement of the gloss, i.e. the amount of light reflected at a given angle from the surface of the mat when illuminated from a standard source at the same angle. Typically, these methods indicate the flat back surface to be one-fourth to one-third more dense than the front surface.

As polymeric materials may be used polycarbonate, polyalkylene, polyester, polyvinyl, polyamide, ionomer and other resins which are extrudable at elevated temperatures in the form of soft flexible continuous filaments and which at lower temperatures have the required stiffness, toughness and other required physical and chemical characteristics to permit cohesion of the filaments. Particular polymers may if desired contain plasticizers or softeners and may be otherwise modified by the addition of coloring agents, fibrous or nonfibrous reinforcing agents, stabilizers, fillers and other additives.

As may be expected hot extruded filaments of the various polymeric materials useful in the invention are not wet with equal ease by water quench bath, and may, therefore, require variation of certain process steps to maintain uniform operating conditions. For example, polyalkylene, polyvinyl chloride and similar materials are not as easily wet as polyester, polycarbonate, poly(vinylbutyral), and polyamide. The addition of from about 0.3 to about 5 weight percent of a wetting agent such as dioctyl sodium sulfosuccinate sold as "Triton GR-5" or octyl phenoxy polyethyoxy ethanol sold as "Triton X-100" to a water quench bath improves the uniformity of wetting of such heated filaments and is generally recommended.

The completed mat may be modified if desired, for example by treatment with solutions or suspensions of resins, bonding agents or coating agents as hereinbefore noted, or by dyeing or metallizing the filaments, or by further addition of particulate materials such as abrasive grains, metal flakes, fibrous flock, ground cork or the like, or by embossing, skiving, shearing, laminating, partial fusing or other physical treatment. An example is the introduction of a plastic screen or film at the contact surface which thereby becomes lightly bonded to the contacting layer of filaments to form a laminate structure.

Although filaments of very small as well as very large diameter may be produced and handled as herein described, products containing filaments within the range of approximately five mils to 125 mils (about 0.1 mm to about 3 mm), or preferably 15 to 35 mils (about 0.4 to about 0.9 mm), in diameter, provide a high degree of resilience and crush resistance together with excellent mechanical strength and are preferred for uses requiring these properties, for example in outdoor carpeting and in cable molds as previously mentioned. Smaller and larger filaments behave similarly in many respects and may be used if desired, but diameters of less than about five mils make for difficulty in extrusion and lack of strength, whereas bundles or mats of rod-like fibers of very large diameter are stiff and difficult to handle and are useful only for specialized purposes.

The flat-surfaced, open, loosely bonded filamentary products of this invention have a number of fields or utility as hereinbefore noted wherein their resiliency, crush-resistance, low density, smooth filament surfaces and other properties combined with their improved surface characteristics offer important advantages. The products are also useful in the decorative field, and for such purposes may be produced in a variety of colors and in various patterns. As an example of the latter, the surface of the drum 12 may be suitably patterned, e.g. provided with cross-bars or other irregularities together with or in place of the pins 16; or a wave motion imparted to the surface of the quench bath may provide a wavy characteristic to the entire mat; or the rate of extrusion of the filaments may be periodically varied for a similar purpose, producing a periodic change in the apparent density or thickness of the mat.

EXAMPLE 1

Sample mats were prepared by extruding under pressure of about 500 psi, polyvinyl chloride resin having a specific gravity of 1.27, through an 18 inch long spinneret having 572-0.020 inch diameter holes arranged in four equal rows spaced 0.20 inch apart. The spinneret was heated to about 300° F. and positioned nine inches above the surface of a 26 inch wide, 36 inch long, and 8½ inch deep water quench bath being flushed with 60°-70° F. water at the rate of 1.2 gallons per minute. Dioctyl sodium sulfonsuccinate wetting agent was pumped into the quench tank at a rate sufficient to maintain a 0.5% concentration thereof in the quench solution. A four inch diameter 22 inch long spiked roll, having 0.073 inch diameter ⅜ inch high cylindrical spikes spaced one inch apart arranged in longitudinal rows with one inch between rows, and with the spikes in adjacent rows staggered one half inch, was positioned in the bath with its axis at the liquid level, and was driven at a surface speed of 10 feet per minute.

Polymer was extruded at the rate of 260 lb./hr., producing filaments from each hole at the rate of 3.7 lineal yards per minute, forming a bundle of filaments consisting of four parallel rows. Two 5000 watt quartz infrared lamps extending the length of the rows, facing opposite major surfaces of the filament bundle and positioned about two inches therefrom, were used to provide additional heat to attenuate the filaments. This attenuation, however, could easily have been accomplished by adjustment of the die temperature.

The extrusion die was first positioned with respect to the spiked roll so that all the rows of filaments contacted the roll surface prior to being quenched, producing a sample mat. The alignment of the filament bundle was thereafter changed to permit some or all of the rows of filaments to fall directly into the quench bath and the remaining rows to fall first upon the surface roll to produce additional sample mats. The sample mats produced varied considerably in structure, particularly in their lofty and open nature.

The lofty open nature of each mat can best be expressed in terms of the mat thickness and percent void volume. The thickness was determined by placing the mat on a flat surface, covering it with a sheet of light weight cardboard, and measuring the spacing between the support and the cover to the nearest millimeter. The percent void volume was determined by first weighing a known area of the mat to determine the mat density. The volume of polymer in that area of mat was then calculated by dividing the measured mat weight by the polymer density. The volume of polymer divided by the mat volume, calculated using the thickness as determined above, gives the fraction polymer in the mat, which subtracted from one and multiplied by 100 gives the percent void volume. The filament diameter of the filaments contained within each test mat was determined by measuring with a micrometer the diameters of several filaments in each mat. Visual observation of the mat was made to determine whether or not it had a dense flat surface.

Thus shown in Tables I-IV "Rows Quenched Directly" indicates the number of rows out of four rows of filaments which fall directly into the quench bath without first falling upon the contact surface of the spiked roll, "Thickness" indicates the measured height in cm. of the mat, "Percent Void Volume" is the calculated percent void volume as hereinabove indicated, "Dense Flat Surface" indicates whether or not the mat has one surface having a more dense concentration of filaments as well as a flat surface, and "Filament Diameter" is the diameter range of filaments in the mat determined by the measurement with a micrometer of the diameter of several filaments in each mat.

TABLE I

| Rows Quenched Directly | Mat Thickness (cm.) | Void Volume (%) | Dense Flat Surface | Filament Diameter (cm.) |
| --- | --- | --- | --- | --- |
| 0 | 0.40 | 64.3 | yes | 0.048-0.051 |
| 1 | 0.95 | 86.6 | yes | 0.048-0.051 |
| 2 | 1.13 | 87.7 | yes | 0.048-0.051 |
| 3 | 1.40 | 90.9 | yes | 0.048-0.051 |
| 4 | 1.51 | 91.8 | no | 0.048-0.051 |

As can be seen in Table I the lofty nature of the mat, represented by the thickness and the percent void volume, increases from 0.40 cm. and 64.3% when no rows are quenched directly, to 1.51 cm. and 91.8% when all four rows are quenched directly. When all four rows are quenched directly, however, no desired dense flat surface is obtained. It should be particularly noted that where all the filament rows first contact the roll surface, a thin, dense mat having a thickness of 0.40 cm. and percent void volume of 64.3, is produced, this being much less than mat produced by directly quenching only one row, thereby indicating the importance of differential quenching in providing a lofty nature to the mat.

Table II shows the effect of varying the mat takeup rate while maintaining a constant extrusion rate thereby varying the ratio of the extrusion rate to takeup rate. Increasing the ratio of the extrusion rate to takeup rate from 3:1 to 7:1 reduces the mat thickness from 1.61 cm. to 1.13 cm. while increasing the percent void volume from 86.1 to 92.1. Thus as can be seen, to obtain a lofty open structure, these rates must be adjusted to produce a mat having sufficient thickness while maintaining a high percent void volume. It can be seen that decreases in the ratio of extrusion to takeup rates beyond that shown would probably produce a thicker denser mat and increases in the ratio beyond that shown would probably produce a thinner lighter weight mat.

TABLE II

| Take-up Ratio (Extrusion: Take-up) | Mat Thickness (cm.) | Void Volume (%) | Dense Flat Surface | Filament Diameter (cm.) |
| --- | --- | --- | --- | --- |
| 3:1 | 1.61 | 86.1 | yes | 0.048-0.051 |
| 4:1 | 1.43 | 89.6 | yes | 0.048-0.051 |
| 5:1 | 1.35 | 90.6 | yes | 0.048-0.051 |
| 6:1 | 1.12 | 91.4 | yes | 0.048-0.051 |
| 7:1 | 1.13 | 92.1 | yes | 0.048-0.051 |

The free fall height from which the filaments are dropped, i.e. the distance between the extrusion die and the quench bath liquid surface, will also affect the finished mat. Table III shows the effect of varying the free fall height within the range of 4.5 to 17 inches above the quench liquid surface. As can be seen, the longer the fall, the smaller the diameter of the filament produced in the mat. Cf. 0.036 to 0.038 cm. for a 17 inch drop to 0.052 to 0.054 cm. for a 4.5 inch drop. Thus more attenuation or stretching out of the filaments can be obtained with a higher free fall height.

TABLE III[1]

| Filament Free Fall Height (in.) | Mat Thickness (cm.) | Void Volume (%) | Dense Flat Surface | Filament Diameter (cm.) |
|---|---|---|---|---|
| 4.5 | 1.40 | 90.0 | yes | 0.052–0.054 |
| 9 | 1.35 | 90.6 | yes | 0.048–0.051 |
| 13 | 0.88 | 85.4 | yes | 0.043–0.045 |
| 17 | 0.60 | 78.6 | yes | 0.036–0.038 |

[1]Filament bundle aligned so that prior to quenching 1 row would contact the roll surface.

Additionally, as the free fall height increases the mat thickness and void volume decrease, thus giving a thinner, more dense, less desirable product at the higher drop heights. As the free fall height is decreased, the percent void volume again decreases, and the filament diameter increases, indicating that the optimum free fall height may be about 9 inches.

TABLE IV[2]

| Filament Drop Height (in.) | Mat Thickness (cm.) | Void Volume (%) | Dense Flat Surface | Filament Diameter (cm.) |
|---|---|---|---|---|
| 9 | 0.40 | 64.3 | yes | 0.048–0.051 |
| 13 | 0.47 | 73.2 | yes | 0.043–0.045 |
| 17 | 0.47 | 70.8 | yes | 0.036–0.038 |

[2]Filament bundle aligned so that all 4 rows would contact the roll surface before quenching.

Table IV likewise shows there is a variation in filament diameter with variation of free fall height even when all four rows of filaments are aligned to first contact the spiked roll surface before quenching. The mats produced, however, are thin and they lack the desired open lofty nature as obtained by differential quenching. Very little variation in mat thickness and void volume is observed with variation of the free fall height. Accordingly, it would appear that hot extruded filaments in this diameter range, first directed to a contact surface, would inherently produce a flattened dense mat, and that adjustment in the free fall height of the filaments has little or no effect upon producing a mat having a lofty and open nature.

EXAMPLE 2

Polyester resin, prepared from ten parts of ethylene glycol, nine parts of terephthalic acid and one part of isophthalic acid and having a density of 1.334 gms./cc., is extruded under pressure of approximately 500 psi as required to obtain the desired rate of flow, through a spinneret having 260 openings arranged in four rows of 65 openings each within a space of $\frac{5}{8}''\times 8''$ and positioned a distance of $8\frac{3}{4}$ inches above the surface of a water quench bath in an apparatus as indicated in FIG. 1. The inner row of openings is arranged above the edge of a polished steel drum having its axis at the water level and fitted with support pins, and which is driven at a surface speed of five feet per minute. The polymer is extruded at a constant rate of 400 grams per minute but at different temperatures and through spinnerets of different orifice diameters as tabulated. The extruded streams begin to pursue a wavy or circular motion at about one inch above the surface of the quench bath, and the drum is set so that the outer streams first contact the drum surface at approximately that point. In the tabulation, O is the orifice diameter in inches; T is the temperature of the resin in degrees F. just prior to extrusion; D is the diameter in inches of the resulting filament as recovered from the mat; L is the average length in inches of the continuous filament segments recovered from a two-inch length of the mat; t is the thickness of the mat in inches; and V is the calculated void volume in percent of total measured volume using the nominal thickness determined as hereinbefore noted.

| O | T | D | L | t | V |
|---|---|---|---|---|---|
| .031 | 490 | .026 | 5.0 | .63 | 95.6 |
| .031 | 500 | .024 | 7.3 | .63 | 95.0 |
| .031 | 510 | .020 | 9.8 | .63 | 95.5 |
| .024 | 490 | .018 | 6.5 | .69 | 95.3 |
| .024 | 500 | .018 | 6.8 | .69 | 95.7 |
| .024 | 510 | .016 | 7.8 | .69 | 95.3 |

In each instance there is produced a unified, well bonded mat which is resistant to crushing under normal hand pressure. It is resilient and springy. The individual continuous filaments are bonded to each other at points of contact but may be broken away and removed intact. The back surface of the mat is flattened and is seen to contain a high concentration of filament, whereas the front surface is rough and irregular and is much more open.

EXAMPLE 3

The procedure of Example 2 is repeated using polycarbonate resin having a density of 1.26 and with the surface of the water quench bath positioned at a distance of six inches beneath the spinneret. Rate of feed is 400 gm./min. and extrusion pressure is in the neighborhood of 800 psi.

| O | T | D | L | t | V |
|---|---|---|---|---|---|
| .031 | 660 | .030 | 6.5 | .63 | 93.6 |
| .031 | 680 | .024 | 8.0 | .69 | 93.6 |
| .031 | 695 | .018 | 9.3 | .63 | 93.5 |
| .024 | 650 | .018 | 8.0 | .63 | 90.7 |
| .024 | 660 | .017 | 9.0 | — | — |
| .024 | 670 | .016 | 11.3 | — | — |

The resulting product is generally similar to that of Example 2 but is somewhat more rigid at each filament diameter.

EXAMPLE 4

Plasticized white pigmented polyvinyl chloride ("Geon 8814") having a density of 1.29 is processed as in the preceding Examples, except that the distance from spinneret to quench bath is six inches, and the take-up speed is 8 inches/min. The extrusion pressure is less than 50 psi.

| O | T | D | L | t | V |
|---|---|---|---|---|---|
| .031 | 380 | .035 | 4.5 | .50 | 90.4 |
| .031 | 390 | .022 | 11.8 | .50 | 91.0 |
| .031 | 400 | .020 | 10.8 | .63 | 92.2 |

-continued

| O | T | D | L | t | V |
|---|---|---|---|---|---|
| .024 | 380 | .018 | 7.0 | .80 | 89.7 |
| .024 | 390 | .017 | 8.5 | .63 | 92.3 |
| .024 | 400 | .017 | 8.0 | .63 | 92.6 |
| .016 | 380 | .016 | 7.0 | .50 | 90.7 |
| .016 | 390 | .016 | 7.8 | .38 | 89.0 |
| .016 | 400 | .015 | 5.5 | .38 | 89.0 |

As described above, mats are prepared having a thickness varying from 0.38 in. (about 1 cm) to 0.80 in. (about 2 cm) and a weight, calculated based upon the thickness, void volume and density of thermoplastic material, which varies from about 1400 to about 2700 grams per square meter.

A red pigmented plasticized polyvinyl chloride ("Geon 8812") under the same conditions gives the following values:

| .031 | 310 | .022 | 10.8 | .44 | 89.0 |
|---|---|---|---|---|---|

When the vinyl resin is extruded directly into the quench bath without first contacting the drum, the strands contact and bond together to such a very limited extent that they come apart or separate into smaller groups or into separate strands under the gentlest handling and the mat cannot effectively be dried, wound up, or otherwise processed as a unit.

In a modified procedure a strip of thin, flexible, vinyl resin coated glass cloth, lightly pre-coated with liquid plasticizer for the vinyl resin, is introduced between the filaments and the rotating drum, which in this instance is free of pins 16. The filaments are lightly bonded to the cloth and to each other in a unified laminate.

The slight degree of bonding initially attained may be improved by subsequent treatment of the product with bonding resins, for example by adding a vinyl plastisol and heating. Similar treatment may be used to bond together two or more mats in either face-to-face or side-by-side position.

EXAMPLE 5

"Surlyn A-1601" ionomer, having a density of 0.94 gm./cc., is extruded in the apparatus previously described, with a drop of 3½ inches from spinneret to quench bath, at a rate of 180 grams/minute with mat recovery at 5 feet/minute, using the 0.031 inch orifice and melt temperature of 450° F., to produce a strong open crush-resistant mat which is flat and dense at the back surface.

The ionomer is a thermoplastic tough copolymer of monomers of the type ethylene and methacrylic acid, and is particularly resistant to abrasion.

What is claimed is as follows:

1. Method of making a smooth-surfaced open porous integrated mat of continuous crinkled filaments by continuous differential quenching, which comprises extruding a hot filament-forming extrudable thermoplastic polymeric material in the form of a bundle of closely-spaced separate continuous filaments, permitting said filaments to fall under their own weight toward the surface of a liquid quench bath, maintaining a contact surface above said quench bath surface in a position to permit brief glancing contact with at least a portion of the outer filaments of said bundle while permitting the remaining filaments of said bundle to fall directly to said bath surface, allowing the filaments to fall into the quench bath, and advancing the resulting bundle of filaments within said quench bath at a linear speed substantially less than the extrusion speed of said filaments, whereby to cause crinkling and inter-engagement of said filaments into a lightly unified mat having a flat surface area of increased density.

2. Method of claim 1 wherein the ratio of advancing speed to extrusion speed is between about 1:2 and about 1:7.

3. Method of claim 1 wherein the polymeric material is extruded as filaments having a diameter between about 5 and 125 mils.

4. Method of claim 3 wherein the polymeric material is extruded as filaments having a diameter between about 15 and 35 mils.

* * * * *